United States Patent [19]

Cherry et al.

[11] Patent Number: 4,557,529

[45] Date of Patent: Dec. 10, 1985

[54] VACUUM INTERRUPTER GUIDE BUSHING RETAINER MEANS

[75] Inventors: Sidney J. Cherry; George R. Turner, both of Elmira, N.Y.

[73] Assignee: Westinghouse Electric Corp., Pittsburgh, Pa.

[21] Appl. No.: 446,150

[22] Filed: Dec. 2, 1982

[51] Int. Cl.$^4$ .......... F16C 29/02

[52] U.S. Cl. .......... 308/4 R; 384/295; 384/439; 200/144 B; 403/397

[58] Field of Search .......... 403/155, 397, 405; 292/258, 288, 259; 308/4 R, 3 R; 24/579, 546, 543; 220/254, 324, 326; 200/144 B; 384/295, 296, 439, 428

[56] References Cited

U.S. PATENT DOCUMENTS

| | | | |
|---|---|---|---|
| 1,097,657 | 5/1914 | Malick | 292/258 |
| 1,114,115 | 10/1914 | Cochran | 292/258 X |
| 1,203,875 | 11/1916 | Hodgson | 292/258 X |
| 2,006,657 | 7/1935 | Smith | 292/288 |
| 2,021,826 | 11/1935 | Ambrose | 292/258 X |
| 2,289,863 | 7/1942 | Batcheller | 292/259 X |
| 2,966,569 | 12/1960 | Jennings | 200/144 B |
| 3,944,771 | 3/1976 | Kohler | 200/144 B |
| 4,064,383 | 12/1977 | Barkan | 200/144 B |

*Primary Examiner*—Donald Watkins
*Assistant Examiner*—David Werner
*Attorney, Agent, or Firm*—Thomas R. Trempus

[57] ABSTRACT

A retainer member formed from wire or sheet metal secures the movable contact rod guide bushing to the end plate closure of a vacuum interrupter.

2 Claims, 4 Drawing Figures

VACUUM INTERRUPTER GUIDE BUSHING RETAINER MEANS

BACKGROUND OF THE INVENTION

The present invention relates to vacuum circuit interrupters which are used to interrupt electric currents in electric power transmission and distribution systems. A conventional interrupter includes a generally cylindrical insulating envelope portion with a pair of contacts hermetically sealed through end plates sealed to the insulating envelope, with the device being evacuated. One of the contacts is movable along the device axis to make and break contact with the fixed contact from a mating closed contact, current carrying position to an open contact, spaced apart circuit interrupting position.

The conventional structure for permitting contact movement is a generally cylindrical bellows which is hermetically sealed at one end to an end plate, and at the other end to the contact which extends slidably through a guide bushing in the end plate.

It has been the practice to fasten the guide bushing to the end plate by the use of an adhesive, by welding or by studs and bolts located in the end plate and guide bushing. The use of adhesive has been found to be unreliable and welding requires a significant degree of device handling which can result in damage to the vacuum interrupter. Bolting the guide bushing to the end plate is an adequate technique but, the requirement of studs on either the bushing or end plate is an undesirable expense. Alternatively, it has been known to use flat head screws fastened into holes tapped in the end plate to secure the guide bushing. This method is also unnecessarily expensive.

It is an object of this invention to provide a guide bushing retaining means which is reliable, inexpensive and simplified in its installation.

SUMMARY OF THE INVENTION

The invention is a retainer member for securing a contact support rod guide bushing to an end plate closure of a vacuum interrupter. In one embodiment, the retainer member comprises a planar portion with an aperture through which the support rod travels and biasing portions extending from opposite ends of the planar portion. The biasing portions terminate in engaging means which grip the edge of the end plate closure. The guide bushing is positively biased against the end plate closure and retained therein by the retainer member. In alternative embodiments, the retainer member is shaped from a resilient length of wire. The guide bushing can be provided with grooves in the upper surface thereof to receive portions of the wire defining the retainer member. The wire can be a single continuous length or an unconnected length of wire.

BRIEF DESCRIPTION OF THE DRAWINGS

The above as well as other features and advantages of this invention will become apparent through consideration of the detailed description in connection with the accompanying drawings in which.

DETAILED DESCRIPTION OF THE INVENTION

Figure 1:
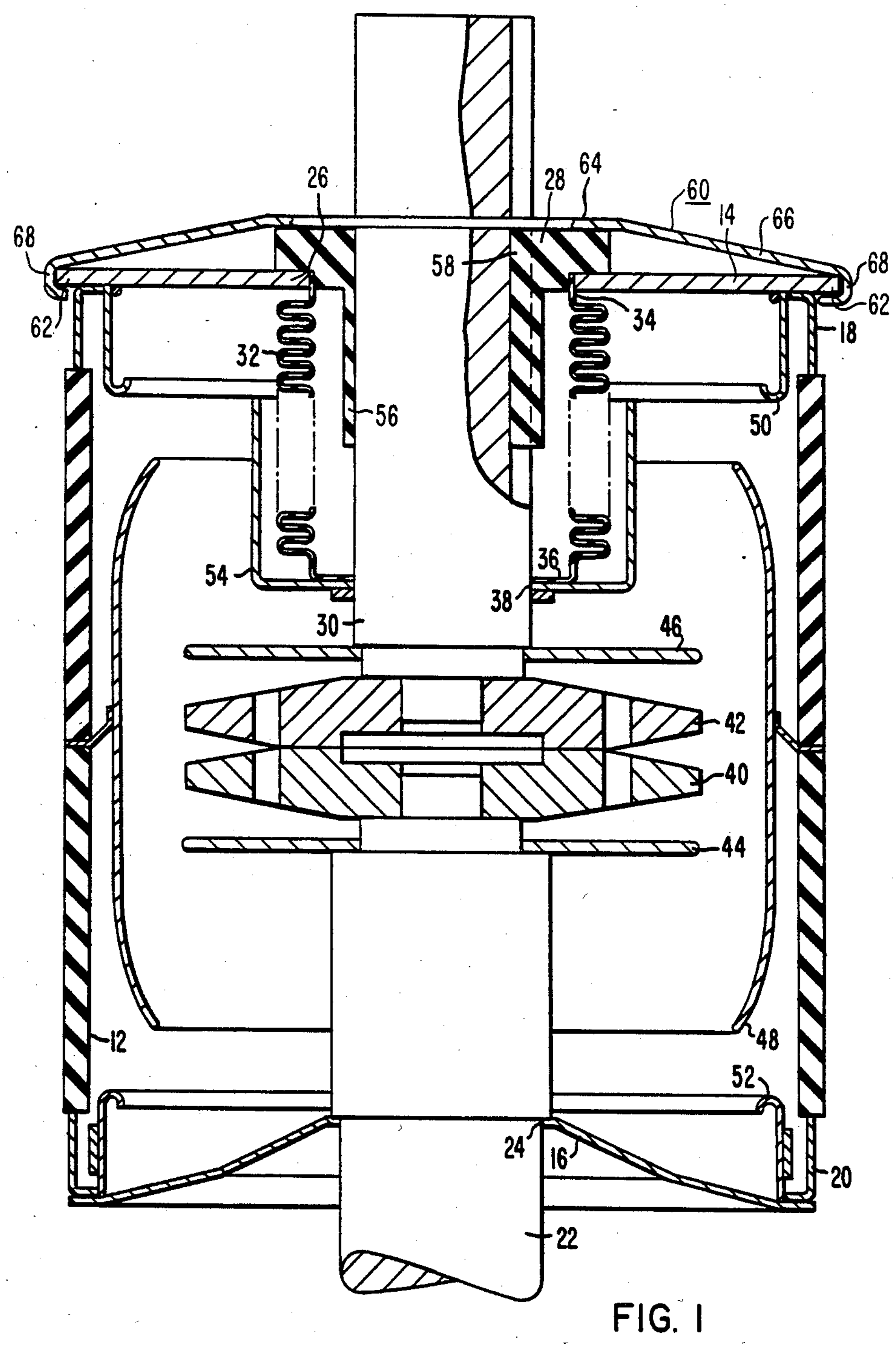
FIG. 1 is an elevational view, partly in cross section, of a vacuum interrupter according to the present invention with guide bushing retainer means.

The snap fit retainer of the present invention can be understood by reference to the drawings wherein FIG. 1 illustrates a typical vacuum circuit interrupter generally indicated by the reference character 10. The interrupter 10 includes a generally cylindrical, insulating envelope 12 with end plate closures 14 and 16. The end plate 14 is at the movable contact end, while end plate 16 is at the fixed contact end.

The fixed end plate 16 is an inwardly dished member with a cylindrical conductive support rod 22 sealed through a central aperture 24 provided through the end plate 16.

The movable end plate 14 is a planar member with a central aperture 26 therethrough. An annular guide bushing member 28 is disposed within the aperture 26 and a movable contact support rod 30 is slidably fitted through the guide bushing member 28. A generally cylindrical bellows seal member 32 is hermetically sealed at one end 34 to the end plate 14 while the other end of the bellows seal member 32 is hermetically sealed to the contact support rod 30 at an axially inwardly extending portion 38.

The arc contacts 40 and 42 which are disposed at the extending ends of respective contact support rods 22 and 30, are of conventional design, and arc shields 44 and 46 are planar members mounted in back of the respective contacts 40 and 42 on the contact support rods.

A generally cylindrical center shield 48 is closely spaced from the insulating envelope 12, while annular end shields 50 and 52 protect respective end seals 18 and 20. A cup-shaped bellow shield 54 which is mounted from movable support rod 30, extends about the bellows 32.

The annular bushing 28 is preferably an insulating member and includes a cylindrical portion 56 which extends coaxially within the bellows 32. The guide bushing 28 can also include an axially extending flange 58 by which the guide bushing 28 is radially aligned and seated within the end plate 14 aperture 26. The guide bushing 28 is secured to the end plate 14 by a retainer member 60 disposed over the bushing and engaged with the outer edge 62 of the end plate 14.

Figure 2:
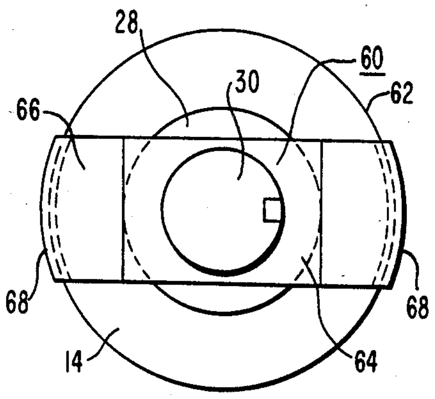
FIG. 2 is a plan view of a vacuum interrupter illustrating a first embodiment of the guide bushing retainer means.

Considering both FIGS. 1 and 2, a first embodiment of the retainer member 60 includes a substantially planar portion 64 with an aperture 66 therethrough having a diameter sufficient to permit the uninhibited travel of the support rod 30 within the guide bushing 28. Biasing portions 66 extends from opposing ends of the planar portion 64 and terminates in an inwardly curving engaging means 68 which secures the retainer member 60 to the end plate enclosure 14. The biasing portion 66 can be defined through the resiliency of the material from which the retainer is manufactured, or can be separately defined as a portion of the retainer which is angularly disposed relative to the planar portion 64 to positively bias the planar portion 64 against the top of the guide bushing 28. The retainer member 60 secures the guide bushing 28 within the end plate 14 by inhibiting the axial displacement of the guide bushing relative thereto. Such a retainer member 60 can be manufactured from a section of sheet metal and formed as described above.

Figure 3:
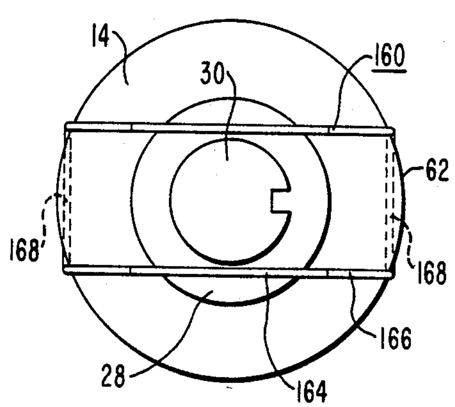
FIG. 3 is a plan view of a vacuum interrupter illustrating an alternative embodiment of the guide bushing retainer means.

An alternative embodiment of a retainer member incorporating the teachings of this invention is illustrated in FIG. 3 and generally indicated by the reference character 160. The retainer member 160 is formed from a length of wire, the ends of which can be fastened together to form a continuous wire member as shown. The wire is formed to define a planar portion 164 which rests against the top of the guide bushing 28. Biasing portions 166 extend from the planar portion and terminate in inwardly curving engaging means 168 which secure the retainer member 160 to the end plate enclosure. The biasing portion 166 of the wire formed retainer member 160 can be angularly disposed according to the criteria discussed above or defined by the resiliency of the wire itself. Moreover, the wire utilized to form the retainer member 160 is of sufficient gauge to both retain the shape of the retainer member 160 and provide the resiliency necessary to retain the guide bushing 28 within the end plate 14. As can be seen in FIG. 3, the wire retainer member 160 consists of essentially parallel lengths or sections of a continuous wire member which straddle the support rod 30.

Figure 4:
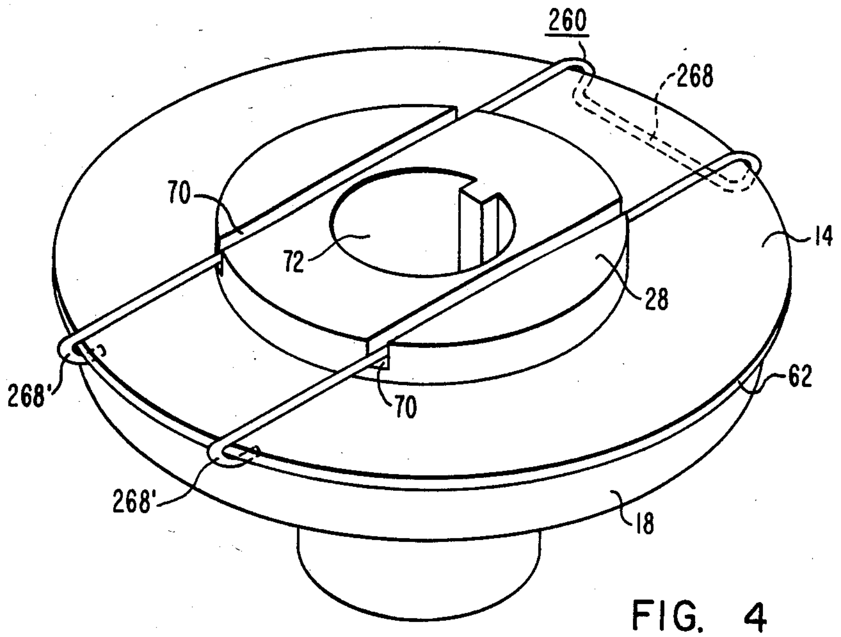
FIG. 4 is a perspective view of a vacuum interrupter end plate with guide bushing and guide bushing retainer means according to a second alternative embodiment of this invention.

Another alternative embodiment of the retainer member of this invention is shown in FIG. 4 and is indicated by the references character 260. The upper surface of the guide bushing 28 is provided with a pair of parallel grooves or channels 70 which straddle the guide bushing aperture 72. The retainer member 260 consists of a single strand of metal wire with an inwardly curving, continuous engaging means 268 formed at the common end thereof, and two generally parallel portions 264 extending from the engaging means 268, each of the two generally parallel portions terminating in an inwardly curving engaging means 268'. The resiliency of the metal wire provides the necessary biasing to retain the guide bushing 28 within the end plate 14. The parallel grooves 70 are engaged by the generally parallel and planar portion 264 of the wire retaining means 260. The grooves 70 inhibit twisting or rotating movement of the guide bushing 28 ,elative to the end plate 14 which is particularly useful when a keyed guide bushing and movable contact support rod are used as shown in FIG. 1. Additionally, when an open-ended wire retainer member 260 is utilized, the grooves 70 tend to lock the retainer member in place by inhibiting any spreading of the separate inwardly curving engaging means 268' relative to each other once the outer edge 61 is engaged.

The use of a pair of grooves 70 as discussed in conjunction with the retainer member 260 of FIG. 4 can be utilized in a continuous metal wire retainer member 160 as shown in FIG. 3. In all of the described embodiments of this invention, the guide bushing retainer member (60, 160 and 260) fits down over the support rod 30, rests against the guide bushing 28 and engages the outer edge 62 of the end plate 14 by means of inwardly curving engaging means (68, 168, 268 and 268').

The vacuum interrupter shown in the drawings is a detailed embodiment, the structure of which can be varied in practicing the invention. The essential aspect of the invention structure is the guide bushing retainer member which substantially simplifies vacuum interrupter construction and assembly.

We claim:

1. A contact support rod guide bushing retainer member for securing a contact support rod guide bushing having a first diameter to an end plate closure having a second diameter greater than said first diameter of an insulating envelope of a vacuum circuit interrupter comprising a continuous length of resilient wire shaped to define two substantially parallel sections which terminate in a continuous engaging means at each end thereof, whereby said parallel sections form in part a planar portion which straddles the supports rod and contacts the guide bushing, and said continuous engaging means at each end secure said retainer member to the end plate closure, positively biasing the guide bushing against the end plate closure and wherein the guide bushing includes an upper surface having an aperture therethrough through which the support rod travels and a pair of substantially parallel grooves in said upper surface which grooves straddle said aperture and are adapted to receive therein at least a portion of said substantially parallel sections of said retainer member whereby rotational movement of the guide bushing relative to the end plate is inhibited.

2. In a vacuum circuit interrupter, the combination of a contact support rod guide bushing retainer member for securing a contact support rod guide bushing to an end plate closure of an insulating envelope, of a vacuum circuit interrupter; an end plate closure of a first diameter, having a central aperture therethrough for receiving the guide bushing therein and including an outer edge portion circumferentially disposed about said end plate closure; and a guide bushing including an upper surface of a second diameter which is less than said first diameter having an aperture therethrough through which a support rod travels and a pair of substantially parallel grooves in said upper surface which grooves straddle said aperture; said retainer member comprising a continuous length of resilient wire shaped to define two substantially parallel sections which terminate in a continuous engaging means at each end thereof which cooperate with said end plate closure outer edge portion to secure said retainer member to said end plate closure, positively biasing said guide bushing against said end plate closure and at least a portion of said substantially parallel sections of said retainer member are received in said guide bushing parallel grooves whereby rotational movement of said guide bushing relative to said end plate closure is inhibited.

* * * * *